United States Patent
Okita et al.

(10) Patent No.: US 7,933,086 B2
(45) Date of Patent: Apr. 26, 2011

(54) POWER SUPPLY VOLTAGE SUPPLY CIRCUIT AND DISK APPARATUS

(75) Inventors: Kazuhito Okita, Kawasaki (JP); Yasunori Izumiya, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 280 days.

(21) Appl. No.: 12/273,860

(22) Filed: Nov. 19, 2008

(65) Prior Publication Data
US 2009/0235095 A1 Sep. 17, 2009

(30) Foreign Application Priority Data
Mar. 17, 2008 (JP) .................................. 2008-067439

(51) Int. Cl.
*G11B 5/09* (2006.01)
*G11B 20/10* (2006.01)

(52) U.S. Cl. ................................ 360/46; 360/51; 360/67
(58) Field of Classification Search ......................... None
See application file for complete search history.

(56) References Cited

U.S. PATENT DOCUMENTS

| | | | | |
|---|---|---|---|---|
| 5,745,066 | A * | 4/1998 | Hirooka et al. | 341/155 |
| 6,865,653 | B2 * | 3/2005 | Zaccarin et al. | 711/154 |
| 7,212,361 | B1 * | 5/2007 | Pederson et al. | 360/31 |
| 7,551,383 | B1 * | 6/2009 | Kupferman | 360/67 |
| 7,583,555 | B2 * | 9/2009 | Kang et al. | 365/226 |
| 2002/0122265 | A1 * | 9/2002 | Chambers et al. | 360/67 |
| 2005/0278463 | A1 * | 12/2005 | Ando | 710/8 |
| 2010/0142075 | A1 * | 6/2010 | Sanghvi | 360/39 |

FOREIGN PATENT DOCUMENTS

JP  A 7-57395  3/1995

* cited by examiner

Primary Examiner — Wayne R Young
Assistant Examiner — James L Habermehl
(74) Attorney, Agent, or Firm — Greer, Burns & Crain, Ltd.

(57) ABSTRACT

Aspects of the present embodiment are related to a power supply voltage supply circuit and the disk apparatus that are capable of reducing power consumption in data writing and reading. The power supply voltage supply circuit includes a data processing unit writing data onto a disk medium and/or reading data from the disk medium=having a plurality of zones assigned a cylinder number, a data input-output unit transmitting data to the data processing unit at a transfer rate in accordance with the zones, a power supply voltage supply unit supplying a voltage to the data input-output unit and a control unit controlling the power supply voltage supply unit in order to supply the voltage in accordance with the transfer rate.

4 Claims, 5 Drawing Sheets

FIG. 2A (NORMAL TEMPERATURES)

| CYLINDER | ZONE | VOLTAGE | CONTROL SIGNAL VALUE |
|---|---|---|---|
| 1～500 | 0 | 1.20 | 1 |
| 501～1000 | 1 | 1.19 | 2 |
| 1001～1500 | 2 | 1.18 | 3 |
| 1501～2000 | 3 | 1.17 | 4 |
| ⋮ | ⋮ | ⋮ | ⋮ |
| (n×500+1)～(n×500+500) | n | 1.00 | N (=n+1) |

FIG. 2B (LOW TEMPERATURES)

| CYLINDER | ZONE | VOLTAGE | CONTROL SIGNAL VALUE |
|---|---|---|---|
| 1～500 | 0 | 1.10 | N+1 |
| 501～1000 | 1 | 1.09 | N+2 |
| 1001～1500 | 2 | 1.08 | N+3 |
| 1501～2000 | 3 | 1.07 | N+4 |
| ⋮ | ⋮ | ⋮ | ⋮ |
| (n×500+1)～(n×500+500) | n | 0.90 | N+M |

FIG. 2C (HIGH TEMPERATURES)

| CYLINDER | ZONE | VOLTAGE | CONTROL SIGNAL VALUE |
|---|---|---|---|
| 1～500 | 0 | 1.30 | N+M+1 |
| 501～1000 | 1 | 1.29 | N+M+2 |
| 1001～1500 | 2 | 1.28 | N+M+3 |
| 1501～2000 | 3 | 1.27 | N+M+4 |
| ⋮ | ⋮ | ⋮ | ⋮ |
| (n×500+1)～(n×500+500) | n | 1.10 | N+M+L |

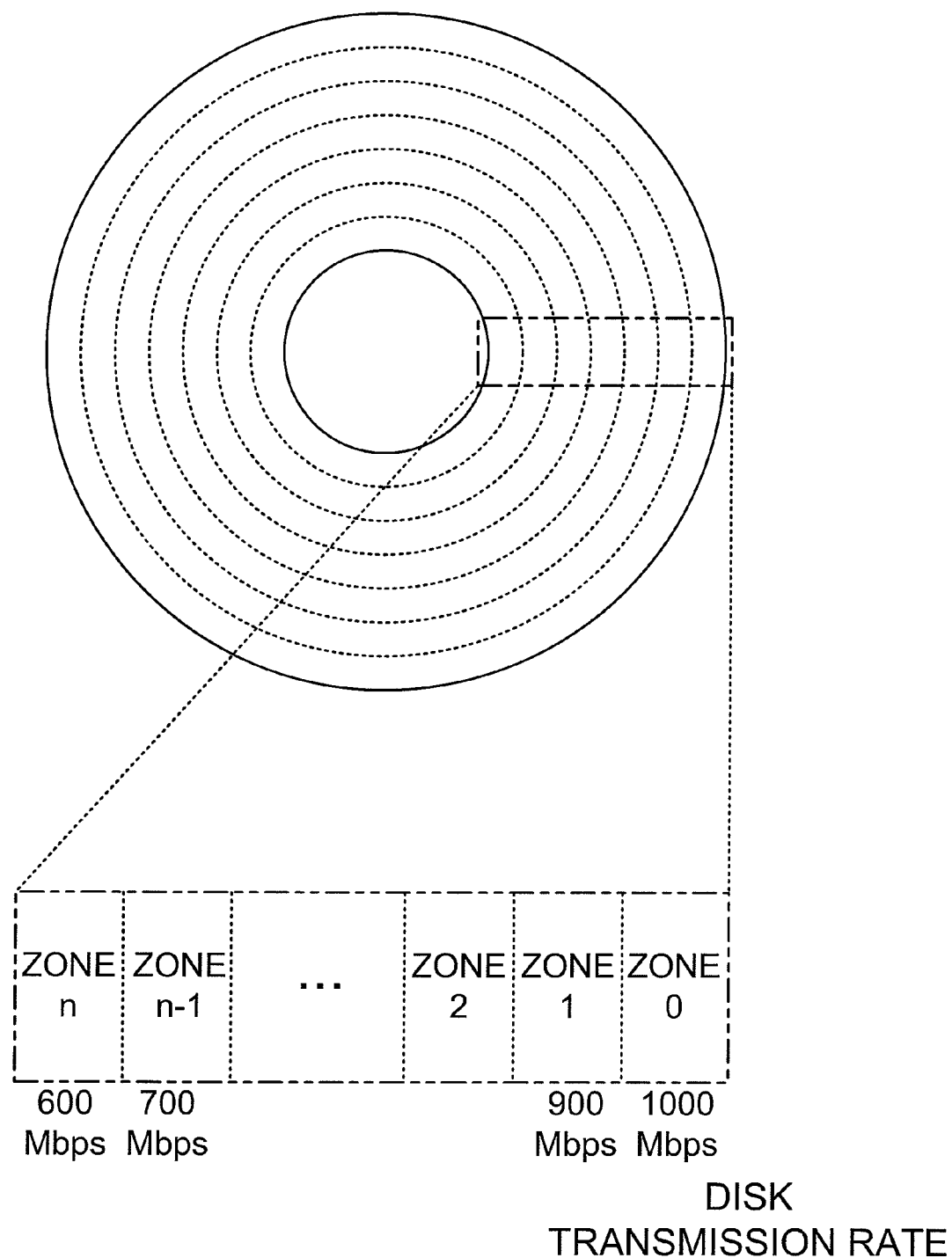

| FIG.4A | FIG.4B |

<DATA WRITING PROCESSING>

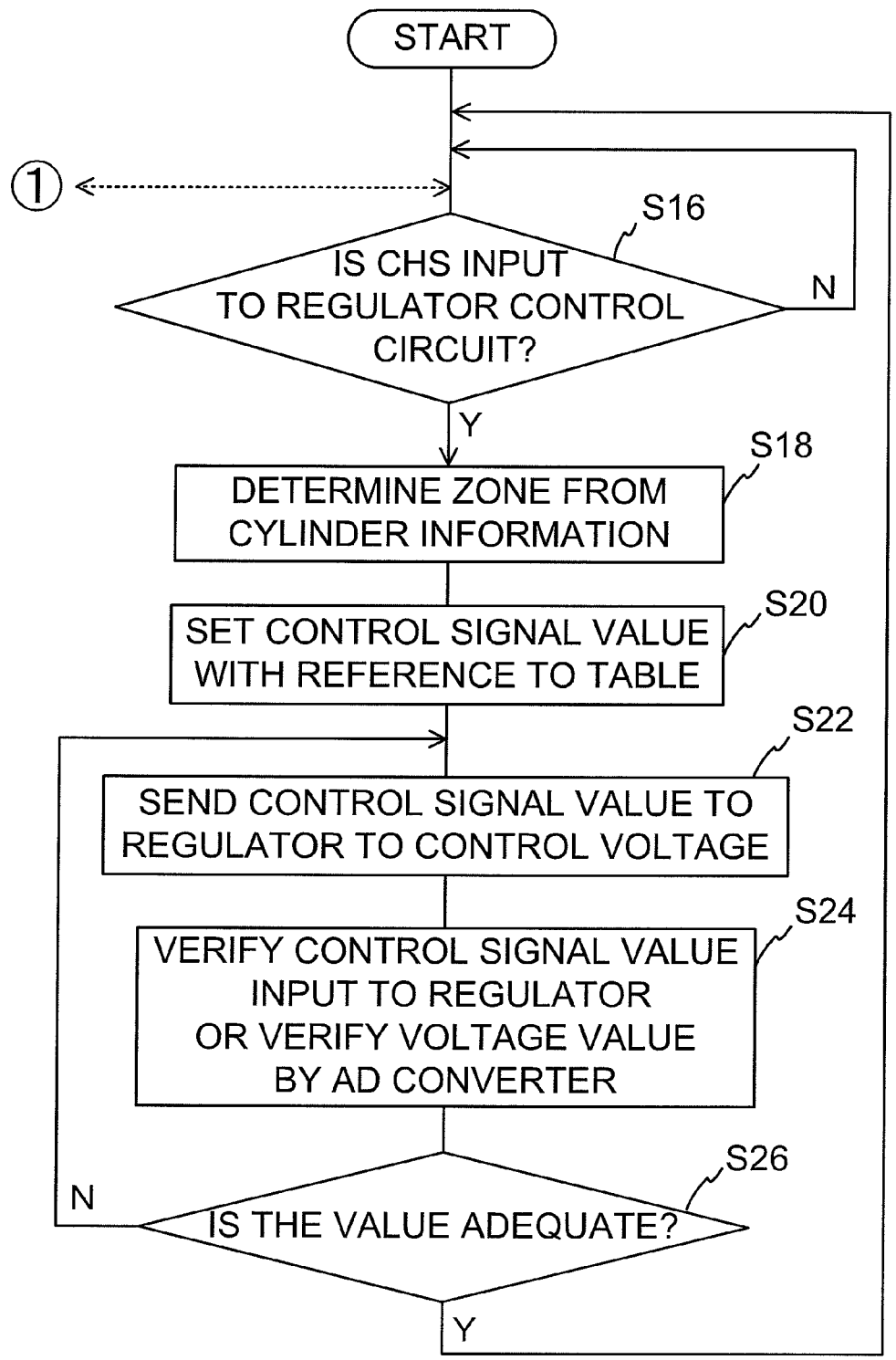

POWER SUPPLY VOLTAGE SUPPLY CIRCUIT AND DISK APPARATUS

BACKGROUND OF THE INVENTION

1. Field of the Invention

The embodiments discussed herein are directed to a power supply voltage supply circuit and a disk apparatus. More specifically, the present invention relates to the power supply voltage supply circuit for supplying a power supply voltage to data input-output unit transmitting data with data processing unit, and to the disk apparatus having the power supply voltage supply circuit.

2. Description of the Related Art

Magnetic recording apparatuses such as hard disk drives (hereinafter referred to as "HDDs") have been used as external magnetic recording apparatuses for computers or for consumer-use video recording apparatuses. The present HDDs are required by users to be capable of processing and storing large amounts of information such as motion pictures at higher speeds and at lower costs.

A system-on-chip (SoC) incorporated in the HDD has a read-write channel. The read-write channel executes signal processing, such as modulating data to be written onto a disk medium with a magnetic head into codes and outputting the data to a head IC, and detecting signals from waveforms read from the disk medium, in other words, demodulating data from signal codes output from the head IC.

Currently, the HDDs are incorporated in portable electronic devices and used in a mobile environment, or connected with personal computers via USB or IEEE1394 buses. For the HDDs used under such conditions, reducing power consumption is particularly expected.

A technique for operating a comparator in accordance with reproduction frequencies by adjusting the magnitude of a current has been disclosed in patent literature 1 (Japanese Unexamined Patent Application Publication No. H7-57395). With the technique, data are reproduced with both high and low frequencies to reduce power dissipation.

With the technique, the current magnitude is controlled with an analog circuit. Thus, the analog circuit becomes intricate. What's more, there has been an expectation for a new technique for reducing the power consumption not only in writing but also in reading.

The power supply voltage supply circuit and the disk apparatus according to this embodiment of the present invention are disclosed to solve the problems described above. An object of the present invention is to provide a power supply voltage supply circuit and a disk apparatus that are capable of reducing power consumption in data writing and reading.

SUMMARY

In accordance with an aspect of embodiments, a power supply voltage supply circuit includes a data processing unit writing data onto a disk medium and/or reading data from the disk medium=having a plurality of zones assigned a cylinder number, a data input-output unit transmitting data to the data processing unit at a transfer rate in accordance with the zones, a power supply voltage supply unit supplying a voltage to the data input-output unit and a control unit controlling the power supply voltage supply unit in order to supply the voltage in accordance with the transfer rate.

BRIEF DESCRIPTION OF THE DRAWINGS

FIGS. 2A through 2C are examples of control tables;

FIG. 3 illustrates associations between zones of the magnetic disk and transfer rates.

DETAILED DESCRIPTION OF THE EMBODIMENTS

Hereinafter, an embodiment of the disk apparatus, an HDD 100, according to the present invention will be disclosed in detail with reference to FIGS. 1 through 4.

Figure 1:
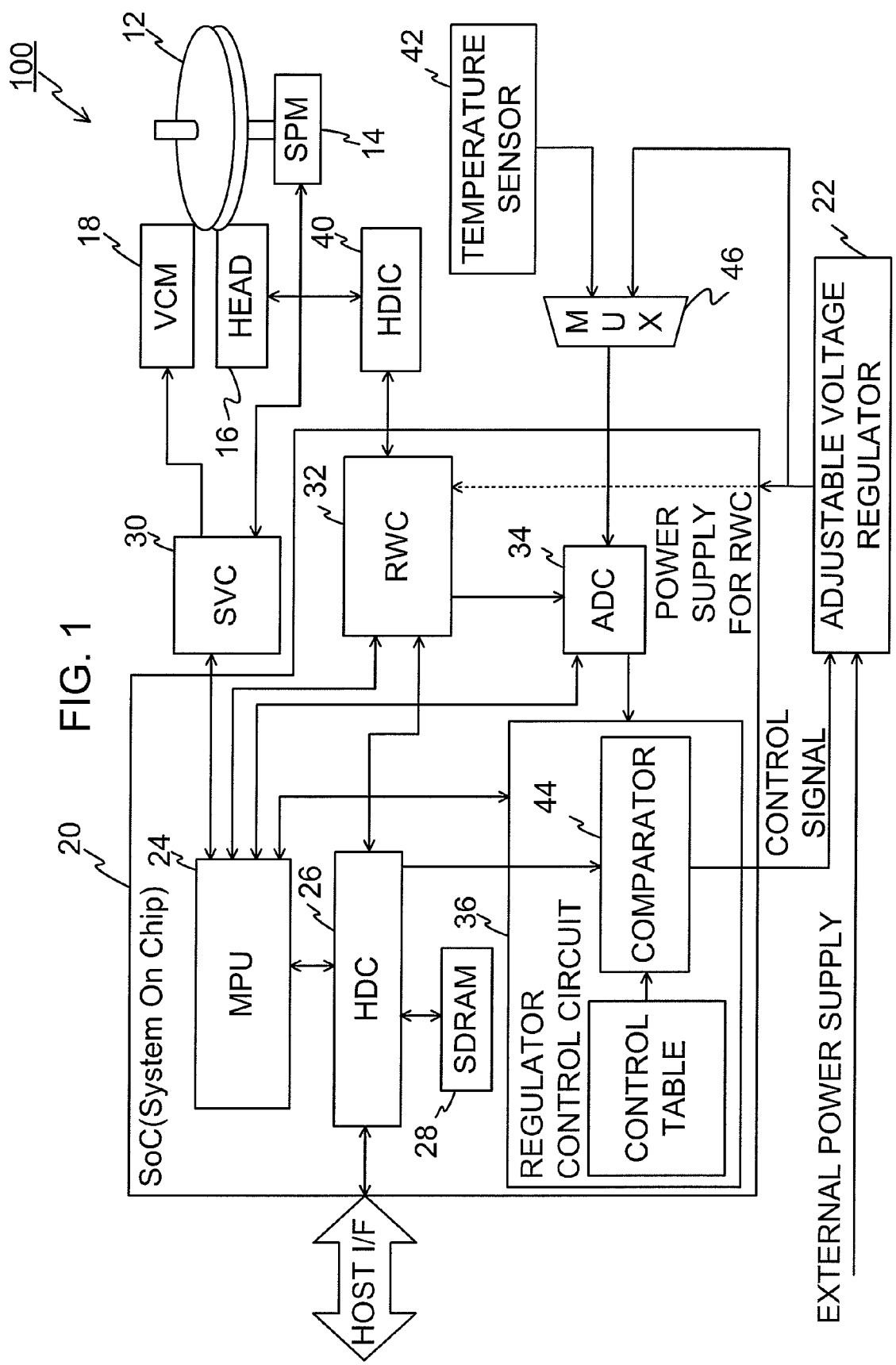
FIG. 1 is a block diagram of the HDD according to an embodiment of this invention.

FIG. 1 illustrates a structure of the HDD 100 in this embodiment schematically. As shown in FIG. 1, the HDD 100 has: multiple disk media, magnetic disks 12; a spindle motor (SPM) 14 for spinning the magnetic disks 12; magnetic heads (HEADs) 16 for writing data onto and reading data from the magnetic disks 12; a voice coil motor (VCM) 18 for positioning the magnetic heads 16 over the magnetic disks 12; a servo combo (SVC) 30; a system-on-chip (SoC) 20 for controlling drive units such as the spindle motor 14 and the voice coil motor 18; a power supply voltage supply unit, an adjustable voltage regulator 22; and a multiplexer (MUX) 46.

The SoC 20 is a highly integrated chip set having: a hard disk controller (HDC) 26; a synchronous dynamic random access memory (SDRAM) 28; a read-write channel (RWC) 32 (means a data input-output unit); an AD converter (ADC) 34; a regulator control circuit 36 as a control unit; a micro processing unit (MPU) 24; and a firmware for controlling a behavior of each component, etc.

The hard disk controller 26 has an error correction circuit, a buffer control circuit, a cache control circuit and an interface control circuit, etc, and controls data reading and writing. The SDRAM 28 is a fast access memory used as a data buffer.

The read-write channel 32 has a modulation circuit for writing data onto the magnetic disks 12, a parallel-serial conversion circuit for converting data to be written into serial data, and a demodulation circuit for reading data from the magnetic disks 12, etc. The read-write channel 32 exchanges data, or signals, with a head integrated circuit (HDIC) 40. The head IC 40 writes data onto the disk media by flipping polar characteristics of current applied to the magnetic heads 16 according to the data to be written, and outputs data read with the magnetic heads 16 to the read-write channel 32.

The AD converter 34 monitors outputs from a temperature sensor 42 and values of voltages produced by the adjustable voltage regulator 22, and outputs data to the MPU 24 and the regulator control circuit 36.

The regulator control circuit 36 has a comparator 44 and control tables. Examples of the control tables are shown in FIG. 2. FIG. 2A shows a control table where the HDD's temperature is normal. FIG. 2B shows a control table where the HDD's temperature is lower than the normal temperature. FIG. 2C shows a control table where the HDD's temperature is higher than the normal temperature. In this embodiment, the temperature of the HDD is monitored by the temperature sensor 42. The regulator control circuit 36 determines which control table to use from among the three tables according to the digital data output through the multiplexer 46 and the AD converter 34. Since a characteristic of the SoC 20, more specifically, the read-write channel 32, depends on temperatures, the three control tables in accordance with the temperature ranges are provided to configure adequate voltages. Thus, the power supply voltage may be controlled more accurately.

The control tables will be disclosed with reference to FIGS. 2A through 2C.

As shown in FIG. 2A, the control table provides zones, voltages and control signal values by specific ranges of cylinder numbers—the cylinder numbers assigned to each track are common to all disks. The cylinders of each magnetic disk 12 in this embodiment are assigned cylinder numbers 1 through n×500+500. One zone includes 500 cylinders, and each zone is assigned a zone number, 0 through n.

Provided that a transfer rate of the HDD 100 is configured constant across all tracks, the bit per inch (BPI) rate on outer tracks is lower than that on inner tracks. This is because time per revolution is constant across all tracks and the tracks become longer on the outer tracks. In this embodiment, the tracks are divided into multiple zones in a radial direction as shown in FIG. 3, and the transfer rates are configured for each zone. The transfer rates increase at greater distances from the center.

As the transfer rate increases, the power supply voltage applied to the read-write channel 32 increases. Adversely, as the transfer rate is reduced, the power supply voltage applied to the read-write channel 32 decreases. Thus, the transfer rates increase as the power supply voltage increases as shown in FIG. 2A.

Bit numbers and values of the control signal values corresponding to the power supply voltages vary with characteristics of the adjustable voltage regulator 22. Therefore, assigning the control signal values to each voltage is desirable for control accuracy. The regulator control circuit 36 controls voltages with high accuracy by controlling the adjustable voltage regulator 22 with the control signal values.

As described previously, the control table shown in FIG. 2B is used when the temperature of the HDD is below the normal temperature. In the control table shown in FIG. 2B, the lower voltages are configured to the zones compared to the control table shown in FIG. 2A. This is because the semiconductor is more efficient in lower temperatures. The control signal values N+1 through N+M are configured to each voltage value. The control signal values do not need to be serial numbers from FIGS. 2A though 2C. Where the voltage values shown in FIGS. 2A and 2B are the same, the control signal values may be the same. The control table shown in FIG. 2C is used when the HDD's temperature is higher than the normal temperature. In the control table shown in FIG. 2C, the higher voltages are configured to the zones compared to the control table shown in FIG. 2A. This is because the semiconductor is less efficient in higher temperatures. The control signal values N+M+1 through N+M+L are configured to each voltage value. Where the voltage values in the control table in FIGS. 2A and 2B are the same, the control signal values may be the same.

The MPU 24 shown in FIG. 1 controls the entire HDD 100. In particular, the MPU 24 controls head positioning, interfaces, initializations and configurations of LSI, and manages media defects.

The adjustable voltage regulator 22 supplies the power supply voltage provided by an external power supply to each component mounted on the SoC 20 and the other components. The adjustable voltage regulator 22 regulates a value of a voltage provided to, at least, the read-write channel 32. More specifically, the adjustable voltage regulator 22 regulates the value of the voltage provided by the external power supply to equal a value adequate for the read-write channel 32 in accordance with the control signal value output from the regulator control circuit 36.

The SVC 30 executes servo control for positioning the magnetic heads 16 over the magnetic disks 12 by driving the spindle motor 14 and the voice coil motor 18.

The multiplexer 46 selects the voltage values output from either the temperature sensors 42 or the adjustable voltage regulator 22, and outputs the voltage value to the AD converter 34.

Figures 4, 4A:
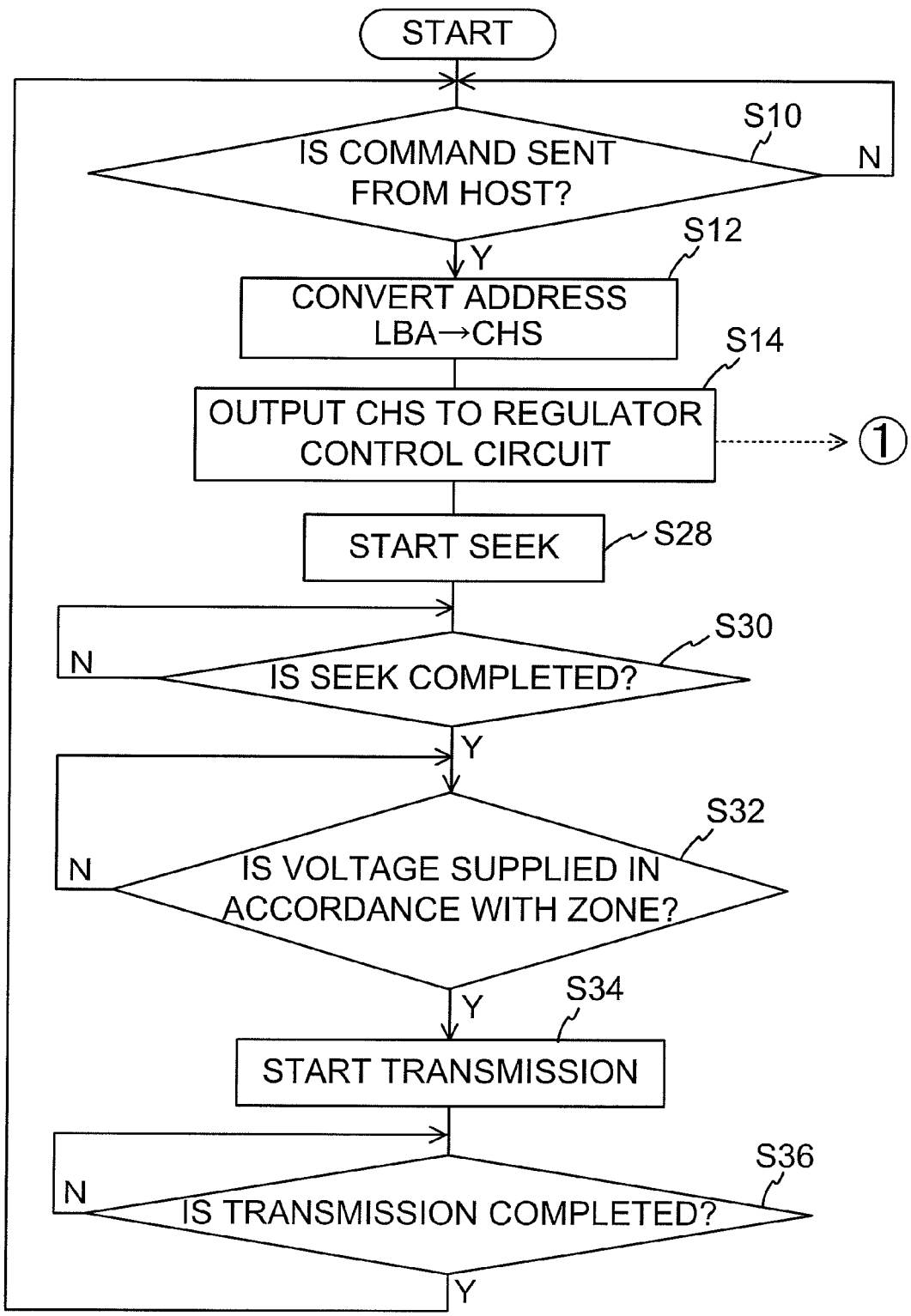
FIG. 4 is a flow chart illustrating processing of data writing and voltage control.

Next, data writing onto and data reading from the magnetic disks 12 by the HDD 100 will be disclosed with reference to the flow charts shown in FIG. 4. The flow chart at the left (FIG. 4A) of FIG. 4 explains the data writing processing, and the flow chart at the right (FIG. 4B) explains the voltage control processing.

Prior to the processing, initial settings for the power supply voltage control are configured. The default settings include the settings of the information on the associations between the cylinders and the zones, the information on voltage values configured to the zones, and the information on the control signal values configured to the voltage values that are stored in the control tables by the firmware of the regulator control circuit 36 based on the zone information prestored in an internal memory of the SoC 20 as parameters. Since the control signal values depends on the characteristic of the adjustable voltage regulator 22, it is desired to store the control signal values in the control tables when configuring the initial settings.

The regulator control circuit 36 determines which control table to use from among FIGS. 2A through 2C prior to the processes described above based on the monitoring result of the temperature sensor 42. The explanations of the processes shown in FIG. 4 herein are made on the precondition that the HDD's temperature is normal and that the control table shown in FIG. 2A is used.

In operation S10 shown in FIG. 4, the hard disk controller 26 receives a write command from a host. In operation S12, the firmware incorporated in the hard disk controller 26 converts a logical block addressing (LBA) value specified by the command to a cylinder-head-sector (CHS) tuple while skipping media defects. In operation S14, the firmware incorporated in the hard disk controller 26 outputs cylinder information of the CHS to the regulator control circuit 36. The data sent from the host via a host interface are buffered in the SDRAM 28 and then transferred to the read-write channel 32.

In the voltage control processing, the regulator control circuit 36 monitors whether the CHS tuple is input in operation S16. When the CHS tuple is input to the regulator control circuit 36 in operation S14, a judgment is made in operation S16, the process moves on to operation S18 by following the YES (Y) arrow in the chart. In operation S18, the firmware incorporated in the regulator control circuit 36, more specifically in the comparator 44, determines a zone based on the input CHS tuple and the control table. In operation S20, based on the zone number and the control table, the voltage value is determined and the control signal value is set. For example, when the cylinder number assigned to an LBA value specified by the command sent from the host is "1200," zone 2 and 1.18V are obtained from the control table shown in FIG. 2A, and the control signal value "3" is set.

In operation S22, the comparator 44 in the regulator control circuit 36 sends the control signal value to the adjustable voltage regulator 22. The adjustable voltage regulator 22 controls the power supply voltage in accordance with the control signal value, and supplies the regulated power supply voltage to the read-write channel 32.

When the supply of the power supply voltage to the read-write channel 32 starts, the MPU 24 verifies whether the proper power supply voltage is being supplied or not by the adjustable voltage regulator 22 in operation S24. For example, a proper power supply voltage may be verified when the control signal value input to the adjustable voltage regulator 22 and the value stored in the regulator control circuit 36 are matched. Similarly, when the voltage value output from the adjustable voltage regulator 22 and obtained through the multiplexer 46 and the AD converter 34 is equivalent to the configured voltage, the proper power supply voltage may also be verified.

In operation S26, a judgment is made based on the verification conducted in operation S24. Where the judgment is YES (Y), the process returns to operation S16. Where the judgment is NO (N), the process moves on to operation S22 and the control signal value is resent to the adjustable voltage regulator 22.

For the data writing processing, the process moves on to operation S28 after completing operation S14, and the magnetic head 16 begins to seek a target according to the command received. The seek operation is implemented by driving the voice coil motor 18 by the MPU 24 through a servo combo 30. After completing the seeking in operation S30, the process moves on to the next operation, S32. In operation S32, a judgment is made as to whether the power supply voltage is adequate or not according to the zone. In this case, the operation may also be decided based on the result of the judgment conducted in operation S26.

When the judgment in operation S32 is YES, the process moves on to operation S34. In operation S34, the read-write channel 32 converts data into signals, and then the signals are transferred to the head IC 40. The head IC 40 writes the transferred signals onto a specified zone, or cylinder, with the magnetic head 16.

After the data transmission is completed in operation S36, the process moves back to operation S10. Every time a command sent from the host is received, the same sequence is repeated.

During the processing, one of the control tables shown in FIG. 2 may be selected depending on the temperature of the HDD.

The processing sequence of writing data onto the magnetic disks 12 has been described above. A data reading processing is basically similar to the data writing processing except that the direction is the reverse of the data writing processing.

As described above, the power supply voltage supply circuit in this embodiment includes: the power supply voltage supply unit, the adjustable voltage regulator 22; the control unit, the regulator control circuit 36; a confirmation unit, the MPU 24, or a combination of the MPU 24, the multiplexer 46 and the AD converter 34; and the data processing unit for transmitting data between the read-write channel 32 and writing data onto and reading data from the magnetic disks 12, the head IC 40, and the magnetic head 16.

As described above, the regulator control circuit 36 controls the adjustable voltage regulator 22 to supply adequate power supply voltage in accordance with the transfer rate to read-write channel 32. In this way, lower power consumption may be achieved compared to the conventional method of supplying uniform power voltage to ensure a maximum transfer rate. In this embodiment, the voltage values are determined depending on the transfer rates, and the adjustable voltage regulator 22 supplies the adjusted power supply voltage to the read-write channel 32. Therefore, the read-write channel 32 transmits data between the head IC 40 efficiently. In this way, the HDD 100 in this embodiment reduces the power consumption in data writing onto and data reading from the magnetic disks 12 with the magnetic heads 16. The low power consuming HDDs in this embodiment are suitable for use in a limited power supply environment, for example, for use in portable electronics or being connected with computers externally through USB or IEEE 1394 interfaces.

Moreover, the adjustable voltage regulator 22 supplies the power supply voltages separately to the read-write channel 32 and the rest of the components on the SoC 20. Therefore, the variable power supply voltages provided to the read-write channel 32 do not interfere with the other components such as the head IC 40, the magnetic heads 16, the voice coil motor 18, or the spindle motor 14, etc., nor do they interfere with the rest of the components on the SoC 20.

Furthermore, the regulator control circuit 36 in this embodiment determines the power supply voltage value applied to the read-write channel 32 with reference to the control table that provides the associations between the zones of the magnetic disks 12 on which data are written or from which data are read by the head IC 40, and that provides the voltage values in accordance with the transfer rates that correspond to each zone. Therefore, the optimum voltage values are determined efficiently.

The regulator control circuit 36 in this embodiment has multiple control tables, in this case, three control tables, according to the ranges of the temperatures of the read-write channel 32 in SoC 20. Since the read-write channel 32 depends on temperature, the regulator control circuit 36 selects one of the control tables according to the temperature of the read-write channel 32 to supply the optimum power supply voltage.

Also, in this embodiment, an accurate supply of power supply voltage (configured voltage) from the adjustable voltage regulator 22 may be ensured by verifying whether the control signal value input into the adjustable voltage regulator 22 matches the value configured in the regulator control circuit 36 or not, and by verifying the adjustable voltage regulator 22 output values (voltage values). Therefore, stable data transmission is ensured.

In this embodiment, the control signal value corresponding to the optimum power supply voltage is sent to the adjustable voltage regulator 22 before data transmission starts. Therefore, stable transmission of data is possible.

Note that this embodiment describes zones that each have different voltage values as shown in FIGS. 2A to 2C. However, this embodiment is not limited to only three zones. For example, multiple zones of differing voltage values may be established if an adjustable voltage regulator 22 cannot control fine voltages due to performance issues.

In this embodiment, the voltage value is verified in operation S24. However, the verification of the voltage value is not necessarily required.

The embodiment described above is a preferred mode of the present invention. However, it is not desired to limit the invention to the exact construction and applications shown and described. Accordingly, all suitable modifications and equivalents may be resorted to, falling within the scope thereof.

What is claimed is:

1. A power supply voltage supply circuit comprising:
   a data processing unit writing data onto a disk medium and/or reading data from the disk medium having a plurality of zones assigned a cylinder number;
   a data input-output unit transmitting data to the data processing unit at a transfer rate in accordance with the zones;
   a power supply voltage supply unit supplying a voltage to the data input-output unit; and
   a control unit controlling the power supply voltage supply unit in order to supply the voltage in accordance with the transfer rate, wherein
   the control unit determines the voltage that is supplied to the data input-output unit by the power supply voltage supply unit using a table providing an association between the zone formed on the disk medium on which the data are written or from which the data are read by the data processing unit and the voltage value in accordance with the transfer rate corresponding to each zone, and the control unit comprises a plurality of table types, and selects one table to use from among the plurality of table types according to a temperature of the data input-output unit.

2. The power supply voltage supply circuit according to claim 1, further comprising:
   a confirmation unit for confirming whether the power supply voltage supply unit supplies the voltage determined by the control unit.

3. A disk apparatus comprising:
   a disk medium;
   a power supply voltage supply circuit comprising:
      a data processing unit writing data onto a disk medium and/or reading data from the disk medium having a plurality of zones assigned a cylinder number;
      a data input-output unit transmitting data to the data processing unit at a transfer rate in accordance with the zones;
      a power supply voltage supply unit supplying a voltage to the data input-output unit; and
      a control unit controlling the power supply voltage supply unit in order to supply the voltage in accordance with the transfer rate, wherein
   the control unit determines the voltage that is supplied to the data input-output unit by the power supply voltage supply unit using a table providing an association between the zone formed on the disk medium on which the data are written or from which the data are read by the data processing unit and the voltage value in accordance with the transfer rate corresponding to each zone, and
   the control unit comprises a plurality of table types, and selects one table to use from among the plurality of table types according to a temperature of the data input-output unit.

4. The disk apparatus according to claim 3, the power supply voltage supply circuit further comprising:
   a confirmation unit confirming whether the power supply voltage supply unit supplies the voltage determined by the control unit.

* * * * *